(12) United States Patent
Kreuter

(10) Patent No.: US 7,950,357 B2
(45) Date of Patent: May 31, 2011

(54) METHOD FOR OPERATING AN INTERNAL COMBUSTION ENGINE AND AN INTERNAL COMBUSTION ENGINE

(75) Inventor: Peter Kreuter, Aachen (DE)

(73) Assignee: META Motoren-und Energie-Technik GmbH, Herzogenrath (DE)

( * ) Notice: Subject to any disclaimer, the term of this patent is extended or adjusted under 35 U.S.C. 154(b) by 0 days.

(21) Appl. No.: 12/747,893

(22) PCT Filed: Dec. 19, 2008

(86) PCT No.: PCT/EP2008/010905
§ 371 (c)(1),
(2), (4) Date: Jun. 11, 2010

(87) PCT Pub. No.: WO2009/083182
PCT Pub. Date: Jul. 9, 2009

(65) Prior Publication Data
US 2010/0269806 A1  Oct. 28, 2010

(30) Foreign Application Priority Data

Dec. 21, 2007 (DE) .......................... 10 2007 061 976
Jun. 2, 2008 (DE) .......................... 10 2008 026 291
Aug. 8, 2008 (DE) .......................... 10 2008 037 121

(51) Int. Cl.
*F02B 33/00* (2006.01)
*F02B 25/00* (2006.01)
(52) U.S. Cl. ........................................ 123/68; 123/70 R
(58) Field of Classification Search ................. 123/53.5, 123/68, 70 R; 60/597, 653, 668, 698, 706, 60/712, 727, 729
See application file for complete search history.

(56) References Cited

U.S. PATENT DOCUMENTS

| 1,771,335 A | 7/1930 | Karpes |
| 4,274,369 A | 6/1981 | Rhoads |
| 4,759,188 A | 7/1988 | Schatz |
| 6,581,553 B2 | 6/2003 | Morikawa et al. |

(Continued)

FOREIGN PATENT DOCUMENTS
AU          737162 B2      8/2001
(Continued)

OTHER PUBLICATIONS

International Search Report for PCT/EP2008/010905, Aug. 10, 2010.

(Continued)

*Primary Examiner* — Noah Kamen
(74) *Attorney, Agent, or Firm* — J-Tek Law PLLC; Jeffrey D. Tekanic

(57) ABSTRACT

An engine comprises a power cylinder having a power chamber, a compression cylinder having a compression chamber and a flow-through chamber connected with the compression chamber when a flow-through valve is open and connected with the power chamber when an intake valve is open. The engine is operated by flowing-in fresh charge into the compression chamber while increasing the volume of the compression chamber, compressing the fresh charge while decreasing the volume of the compression chamber, pushing-over the compressed fresh charge into the flow-through chamber, pushing-out the fresh charge into the power chamber, combusting the fresh charge while increasing the volume of the power chamber and discharging the combusted charge while decreasing the volume of the power chamber. The flow-through chamber volume increases during at least a part of the pushing-over step and, at the end thereof, the volume is less than 15% of its maximum volume.

32 Claims, 11 Drawing Sheets

U.S. PATENT DOCUMENTS

| | | |
|---|---|---|
| 6,668,779 B2 | 12/2003 | Hendriksma et al. |
| 2003/0024502 A1 | 2/2003 | Kreuter |
| 2004/0065298 A1 | 4/2004 | Kreuter |
| 2004/0177820 A1 | 9/2004 | Kreuter et al. |
| 2004/0226523 A1 | 11/2004 | Kreuter et al. |
| 2005/0152798 A1 | 7/2005 | Kreuter et al. |
| 2005/0268609 A1 | 12/2005 | Branyon et al. |
| 2007/0157894 A1 | 7/2007 | Scuderi et al. |
| 2010/0162979 A1 | 7/2010 | Kreuter et al. |

FOREIGN PATENT DOCUMENTS

| | | |
|---|---|---|
| DE | 577740 C | 5/1933 |
| DE | 2122523 A1 | 11/1972 |
| DE | 2423576 A1 | 11/1975 |
| DE | 3433619 A1 | 2/1986 |
| DE | 60021901 T2 | 7/2006 |
| EP | 0126465 A1 | 11/1984 |
| FR | 2758589 A1 | 7/1998 |
| JP | 57-91324 A | 6/1982 |
| WO | 01/16470 A1 | 3/2001 |

OTHER PUBLICATIONS

Office Action dated Sep. 23, 2008 for priority German patent application No. 10 2007 061 976.8-13.

International Preliminary Examination Report for parent International Application No. PCT/EP2008/010905, Jul. 16, 2009.

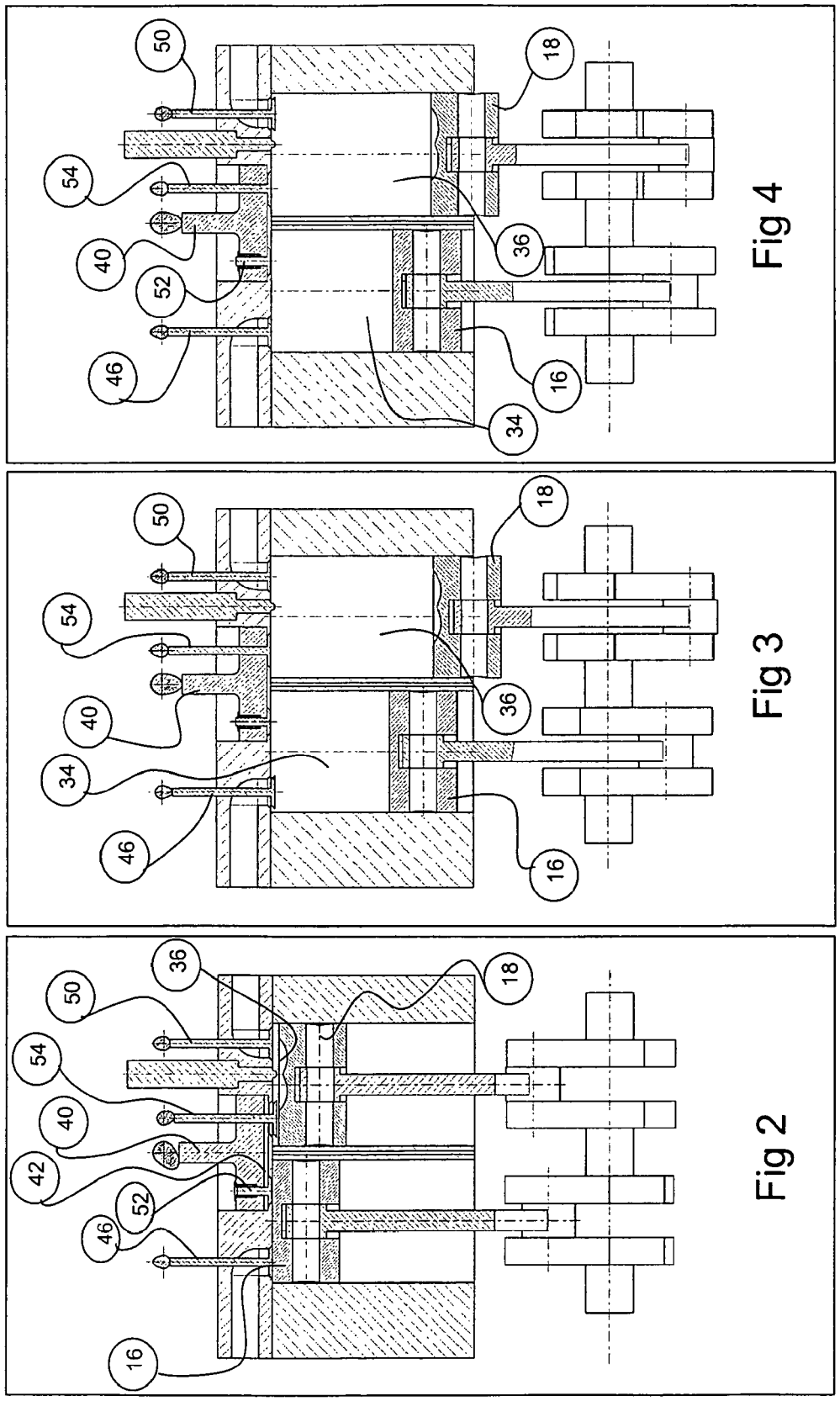

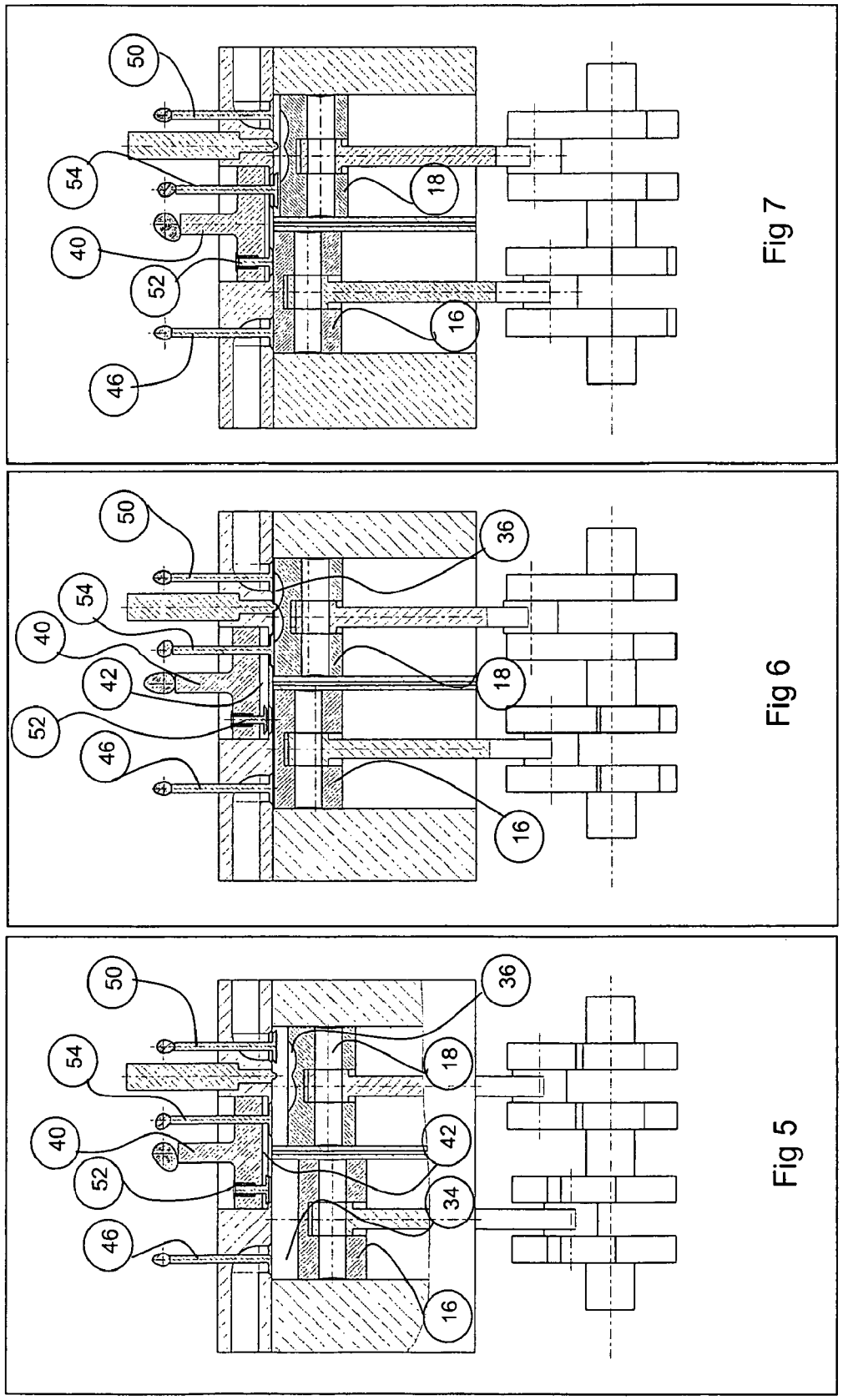

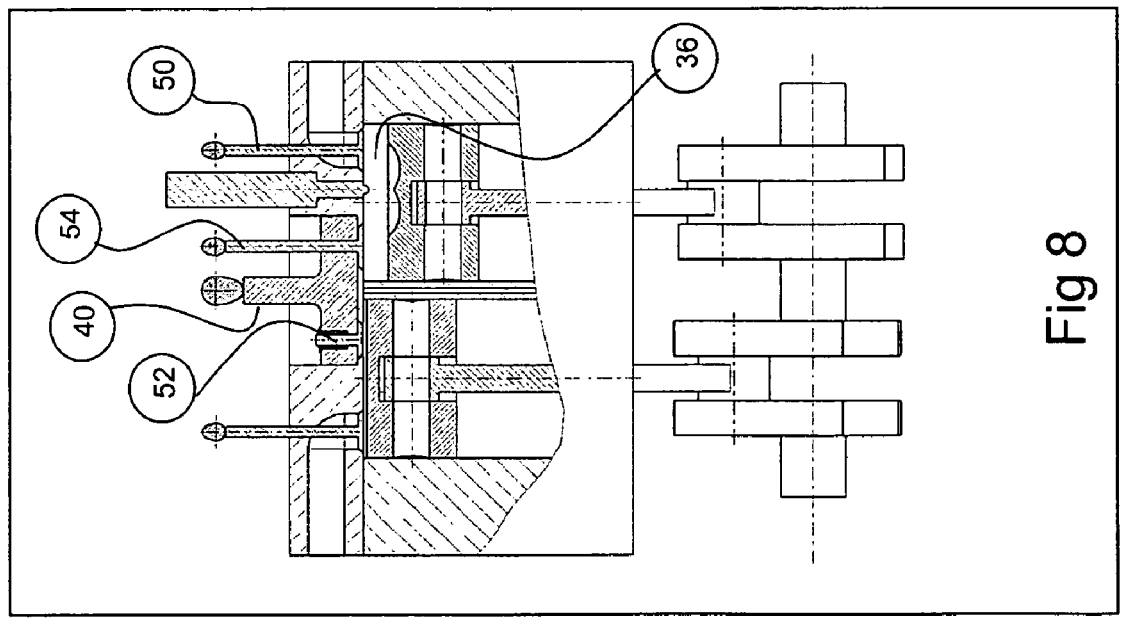

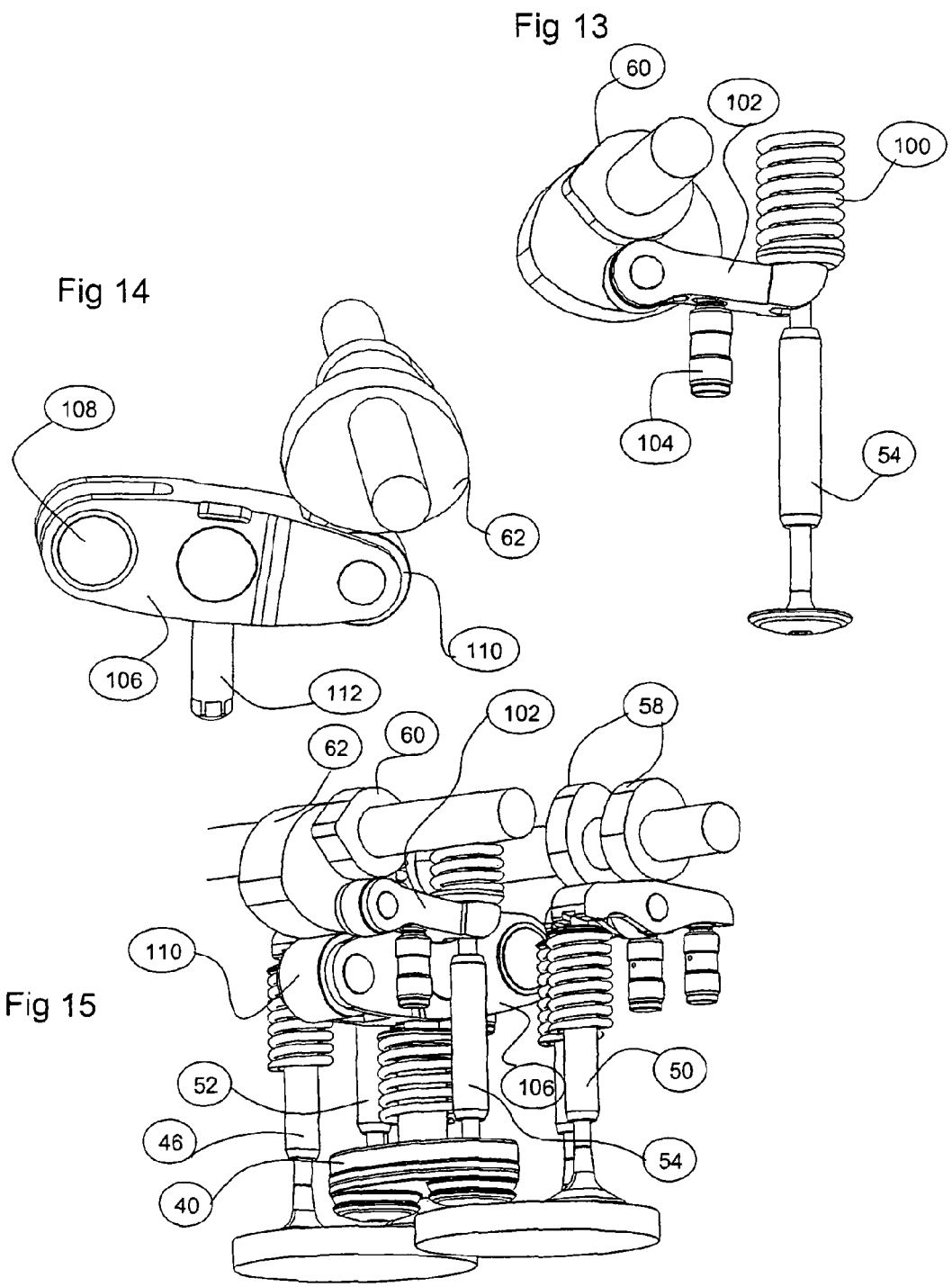

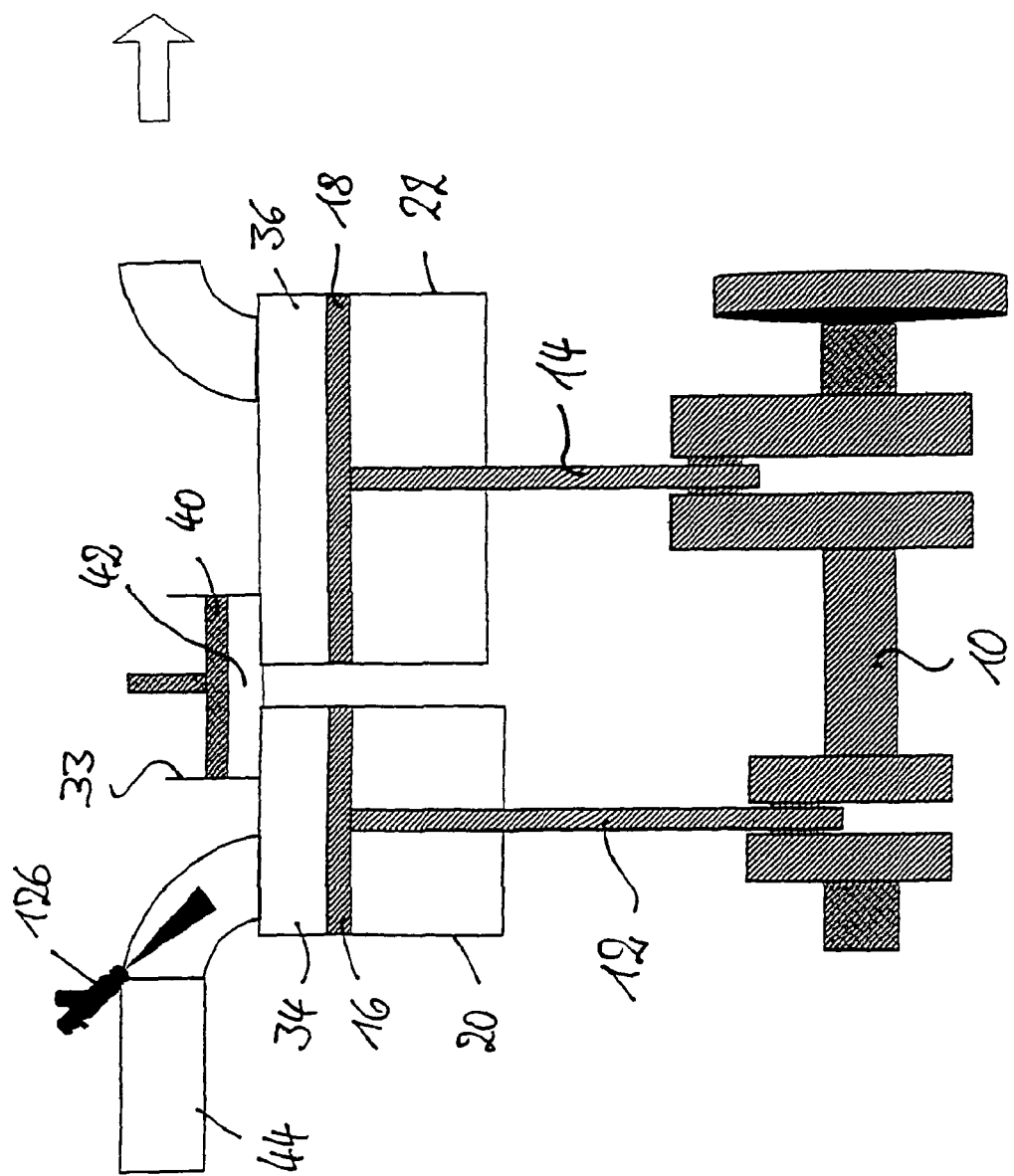

METHOD FOR OPERATING AN INTERNAL COMBUSTION ENGINE AND AN INTERNAL COMBUSTION ENGINE

CROSS-REFERENCE

This application is the U.S. national stage filing of International Application No. PCT/EP2008/010905 filed Dec. 19, 2008, which claims priority to German patent application no. 10 2007 061 976.8 filed Dec. 21, 2007, German patent application no. 10 2008 026 291.9 filed Jun. 2, 2008 and German patent application no. 10 2008 037 121.1 filed Aug. 8, 2008.

TECHNICAL FIELD

The invention relates to a method for operating an internal combustion engine and an internal combustion engine operable in accordance with such a method.

RELATED ART

In the interests of resource conservation and the reduction of environmental pollution, an increasingly-urgent development objective in the development of internal combustion engines, as can be utilized in particular in passenger cars, is the reduction of the fuel consumption and/or the improvement of the efficiency, wherein efficiency is understood herein as being the fuel consumption with regard to the mechanical energy that is derivable at the crankshaft.

A characteristic of conventional reciprocating-piston internal combustion engines is that the entire thermodynamic process (intake, compression, combustion and exhaust) takes place in a single cylinder, which means substantial compromises with respect to the usability of the combusted fuel energy. Attempts to distribute the entire thermodynamic process over two cylinders are known, e.g., from US 2005/0268609 A1. In this known internal combustion engine, fresh charge is pushed over from a compression cylinder into a power cylinder by temporarily connecting a constant intermediate volume. This pushing-over take place while there is a high pressure difference, whereby the efficiency is unsatisfactory as a result of thermal losses and flow losses.

A further characteristic of modern reciprocating-piston internal combustion engines is in the fuel injection technique, by which gasoline or diesel fuel is directly injected into the combustion chamber. In spark-ignited engines, this technique does not require a high injection pressure, but the following are required: a very precise control of the fuel injection time point and the fuel injection amount, a combustion chamber geometry designed in view of optimal combustion that minimizes pollution as much as possible and an expensive exhaust gas post-treatment. In diesel motor operation, a very high injection pressure (over 2000 bar) and an expensive exhaust gas post-treatment, including a diesel particle filter, are necessary for soot reduction reasons.

An internal combustion engine having a regenerator and a hot air ignition device is described in DE 600 21 901 T2. A compression cylinder is connected with a power cylinder via a regenerator. A valve operates in the connection between the compression cylinder and the regenerator. The regenerator is connected with an exhaust via an exhaust valve.

DE 3433619 A1 describes an internal combustion engine having a first cylinder and a second cylinder that are connected with each other via a flow-through chamber. A valve is disposed in the connection from the first cylinder into the flow-through chamber. The flow-through chamber, whose volume is constant, is always connected with the second cylinder.

DE 577740 describes a pressurized-air internal combustion engine, wherein a flow-through chamber R is disposed between a compression cylinder and a power cylinder; the volume of the flow-through chamber is constant.

U.S. Pat. No. 1,771,335 describes an internal combustion engine that operates according to a 6-stroke cycle and has a plurality of cylinders. A plurality of intake manifold pipes is formed in the cylinder head of the internal combustion engine, one communicating with each two cylinders. In addition, exhaust manifold pipes are provided, one for each cylinder. A connection between the intake and exhaust manifold passages is controlled by valves. In addition, an auxiliary manifold is provided in the cylinder head that communicates with all cylinders and whose connection with the cylinders is controlled by valves.

An internal combustion engine having a compression cylinder and a power cylinder is described in JP 57091324 A, the cylinders being connected by a flow-through chamber. The compression piston and the power piston are simultaneously located at the top dead point. Thus, the fresh charge compressed by the compression chamber is completely located in the flow-through chamber and is separated from the power cylinder. After ignition of the fresh charge located in the flow-through chamber, an intake valve opens into the power cylinder so that the combusting fresh charge expands into the power cylinder.

US 2007/0157894 describes an internal combustion engine having a compression piston operating in a compression cylinder and a power piston operating in a power cylinder. A fresh charge intake valve operates in an intake of the compression chamber. The compression chamber of the compression cylinder is connected with the power chamber of the power cylinder via a flow-through chamber, in whose branch from the compression chamber a flow-through valve formed as a check valve is disposed. An intake valve is disposed in the opening of the flow-through chamber into the power chamber. The power chamber is connected via an exhaust valve with the exhaust manifold of the internal combustion engine. The valves are actuated by cams that are, e.g., formed on a cam shaft connected with the crankshaft so that they rotate together. The crankshaft is connected with the pistons via piston rods. The power piston is advanced relative to the compression piston by a phase angle of 10° to 40°, wherein this phase angle is selected such that, when the compression piston moves towards its top dead center, the power piston moves away from its top dead center and thus substantially the same mass of compressed air is transferred from the power piston into the flow-through chamber and from the flow-through chamber into the power chamber. When the power piston moves further downwards, typically in a range between 10° to 30° after top dead center, the charge located in the power chamber ignites. During the entire operation, the flow-through valve formed as the check valve and the intake valve in the power chamber hold the gas pressure within the flow-through chamber at a value that is at least as high as the pressure value, at which the charge ignites.

SUMMARY

In one aspect of the present teachings, a method for operating an internal combustion engine is disclosed, as well as an internal combustion engine, one or both of which is capable of operating at an improved efficiency relative to known internal combustion engines.

In another aspect of the present teachings, an internal combustion engine may comprise at least one power cylinder having a power chamber defined by a power piston, the at least one power cylinder having an intake valve and an exhaust valve, at least one compression cylinder having a compression chamber, which is defined by a compression piston, the compression cylinder having a fresh charge intake valve and a flow-through valve, and a flow-through chamber, which is connected with the compression chamber when the flow-through valve is open and which is connected with the power chamber when the intake valve is open. A method for operating such an internal combustion engine may include flowing-in fresh charge into the compression chamber while increasing the volume of the compression chamber, compressing fresh charge located in the compression chamber while decreasing the volume of the compression chamber, pushing-over the compressed fresh charge into the flow-through chamber, pushing-out the fresh charge located in the flow-through chamber into the power chamber, combusting the fresh charge located in the power chamber while increasing the volume of the power chamber and while converting thermal energy into mechanical output power and discharging the combusted charge while decreasing the volume of the power chamber. The volume of the flow-through chamber increases during at least a part of the pushing-over and, at the end of the pushing-out, the volume is preferably less than 15%, more preferably less than 10%, even more preferably less than 5% and still more preferably less than 1% of the maximum volume of the flow-through chamber.

By compressing the fresh air in the compression chamber outside of the hot power cylinder and by pushing out the fresh charge, which is compressed in each operation cycle and is pushed over into the flow-through chamber if desired while being further compressed during each operation cycle, at least to a large extent, preferably at least nearly completely, into the power chamber and using it for combustion, the compression work is decreased with good filling at the same time, whereby the efficiency of the internal combustion engine is increased.

With the inventive method and/or an inventive internal combustion engine, substantially all gaseous and liquid fuels can be combusted. For example, gaseous or liquid fuel introduced upstream of the compression chamber or into the compression chamber of the fresh air can be processed with the fresh air, during the compression occurring in the compression cylinder and the subsequent flowing-through into the flow-through chamber, into an excellent combustible mixture, which is pushed-over in a highly compressed manner from the flow-through chamber into the power chamber and preferably spontaneously combusts there without any spark ignition. In this way, diesel fuels can be used without the necessity of high injection pressure and gasolines can be used without spark ignition, wherein a low pollution gas is also achieved due to the very good mixture preparation.

The invention, which can be used for stationary internal combustion engines and for internal combustion engine installed in vehicles, ships, etc., is explained in an exemplary manner in the following with the assistance of schematic drawings and with further details.

BRIEF DESCRIPTION OF THE DRAWINGS

FIGS. 2 to 8 show views similar to FIG. 1 in different operating states;

FIG. 13 shows a perspective view of an inverted intake valve;

FIG. 14 shows a perspective view of a roller cam follower for actuating the flow-through piston;

FIG. 15 shows an embodiment of the valve mechanism using components of FIGS. 13 and 14;

FIG. 16 shows a schematic drawing of an inventive internal combustion engine having intake-manifold fuel injection;

DETAILED DESCRIPTION OF THE INVENTION

Figure 1:
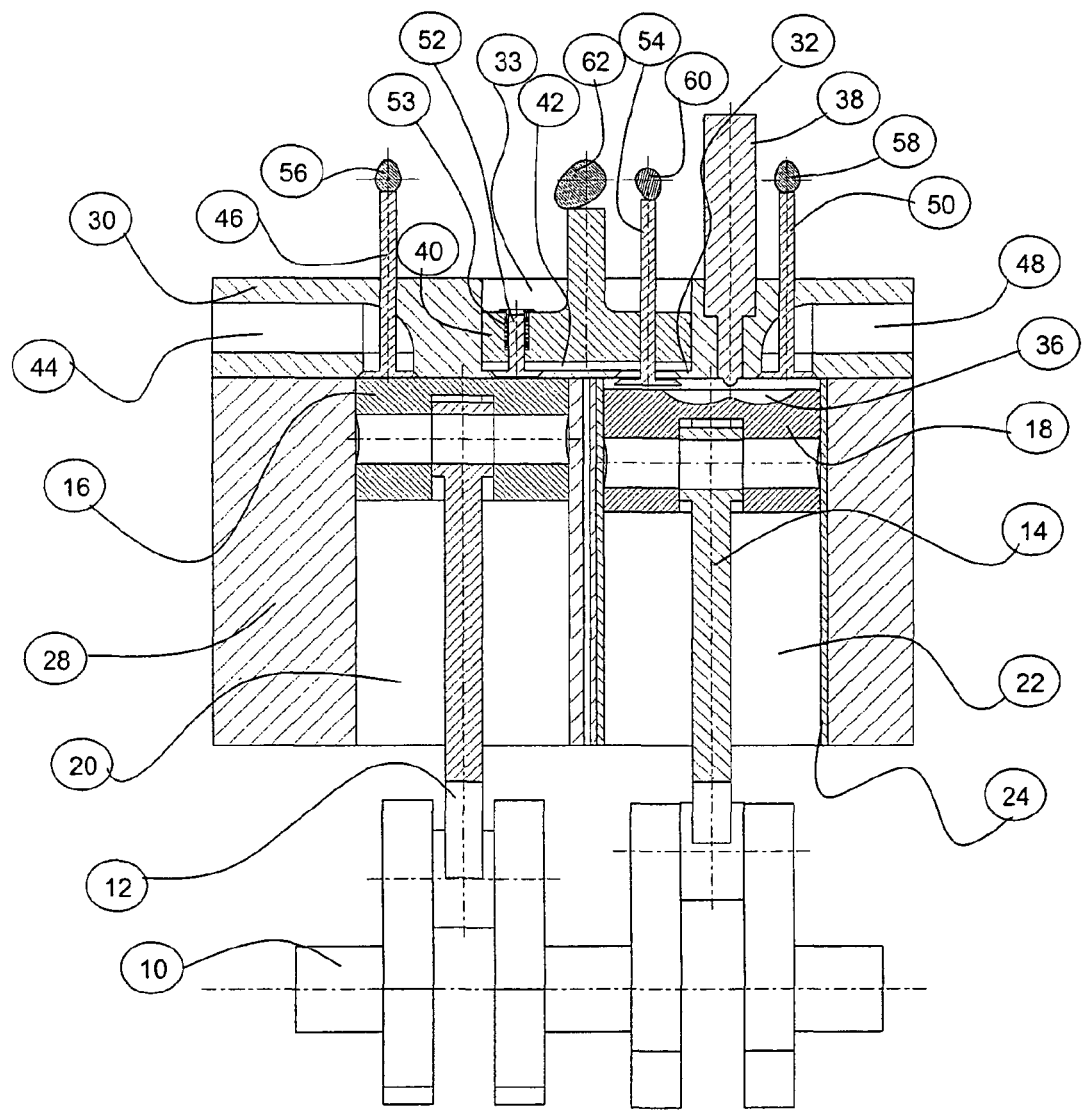
FIG. 1 shows a schematic cross-sectional view of parts of an inventive internal combustion engine having a compression cylinder, flow-through cylinder and power cylinder.

According to FIG. 1, an inventive internal combustion engine includes a crankshaft 10 having two adjacent cranks that are each connected via a piston connecting rod 12 and 14, respectively, with a compression piston 16 and a power piston 18, respectively. The compression piston 16 is movable within a compression cylinder 20. The power piston is movable within a power cylinder 22, wherein the power cylinder 22 is preferably lined with a cylinder liner 24.

The cylinders, which are preferably formed within a common cylinder housing 28, are sealed from above by a cylinder head 30, which includes a relatively thin end wall 32 in an area overlapping the two cylinders 20 and 22; the end wall 32 encloses portions of the cylinders 20 and 22 from above and encloses a flow-through cylinder 33 formed in the cylinder head 30 from below.

A compression chamber 34 is formed between the compression piston 16 and the cylinder head 30 (see FIG. 3). A power chamber 36 is formed between the power piston 18 and the cylinder head 30; an injection valve 38 projects into the power chamber 36.

A flow-through piston 40 is movable in the flow-through cylinder 33; the flow-through piston 40 delimits a flow-through chamber 42.

A fresh air and/or fresh charge intake manifold 44 is formed in the cylinder head 30; a fresh charge intake valve 46 operates in the manifold 44 and controls the connection between the fresh charge intake manifold 44 and the compression chamber 34. The term "fresh charge" comprises the substances pure fresh air and fresh air with fuel and/or residual gas added into it.

An exhaust manifold 48 is also formed in the cylinder head 30; an exhaust valve 50 operates in the exhaust manifold 48 and controls the connection between the power chamber 36 and the exhaust manifold 48.

A flow-through opening, which connects the compression chamber 34 with the flow-through chamber 42, is formed in the end wall 32; a flow-through valve 52 operates in the flow-through opening and opens in a movement away from the compression chamber. A shaft of the flow-through valve 52 is movably guided in the flow-through piston 40 in a sealed manner, wherein the flow-through valve 42 is movable into the flow-through piston 40 against the force of a spring 53 and is movable out of the flow-through piston 40 preferably with a restricted stroke.

An intake valve 54 operates in another opening of the end wall 32, which opening connects the flow-through chamber 42 with the power chamber 36; the shaft of the intake valve 54 is movably guided through the flow-through piston 40 in a sealed manner.

A fresh charge cam 56, an exhaust cam 58 and an intake cam 60 serve to actuate the valves 46, 50, 54, respectively. The flow-through piston 40 is actuated by a flow-through cam 62.

The cams are formed in an appropriate manner on one or more cam shafts that are preferably driven by the crankshaft 10 at the same rotational speed as the rotational speed of the crankshaft.

The function of the internal combustion engine described in terms of its basic construction will be explained in the following with the assistance of FIGS. 2 to 8, wherein only a few reference numbers are inserted into these figures for the purpose of clarity.

FIG. 2 shows the internal combustion engine in a state in which the compression piston 16 has reached its top dead point and the volume of the compression chamber is minimal (nearly zero). The flow-through piston 40 is located shortly before its top dead point (the position defined as the top dead point of the flow-through piston 40 is the position in which the flow-through chamber 42 has a minimum volume (nearly zero)). The power piston 18 has already left its top dead point. In this exemplary embodiment, it is advanced relative to the compression piston 16 by a few degrees, which is achieved by suitably offsetting the associated cranks of the crankshaft 10.

The fresh charge intake valve 46 is closed. The flow-through valve 52 is closed. The intake valve 54 is open and the exhaust valve 50 is closed.

The state of FIG. 2 corresponds approximately to the state in which an intake of fresh charge and/or a filling of the compression chamber 34 with fresh charge begins and compressed fresh charge contained in the flow-through chamber 42 has not completely flowed through into the power chamber 36.

The state is illustrated in FIG. 3 in which the filling of the compression chamber 34 with fresh charge is substantially finished, wherein the compression piston 16 is located nearly in the region of its bottom dead point, the flow-through piston 40 is located in its top dead point—i.e. at its minimum volume—and the power piston 18 is located at the end of a power stroke, which had begun shortly after the state of FIG. 2, in which fresh charge is combusted. The fresh charge intake valve 46 is still open, the flow-through valve 52 has moved against the force of the spring 53 substantially into the flow-through piston 40 and the intake valve 54 and the exhaust valve 40 are closed.

FIG. 4 shows the state in which the compression of the fresh charge begins approximately simultaneously with the discharge of the combusted charge. The compression piston 16 moves upwards after passing through its bottom dead point in order to compress the fresh charge in the compression chamber 34. The flow-through piston 40 is also located in the region of its top dead point.

The flow-through valve 52 and the intake valve 54 are closed. The power piston 18 begins its upward movement. The exhaust valve 50 is opened.

FIG. 5 shows the state in which the flowing-through of the compressed charge located in the compression chamber 34 into the flow-through chamber 42 begins:

With the fresh charge intake valve 46 still closed, the compression piston 16 approaches its top dead point. The flow-through piston 40 moves away from its top dead point, wherein the flow-through valve 52 moves out of the flow-through piston 40 by the force of the spring 53 and is opened by the pressure in the compression chamber 34. As a result, compressed fresh charge can flow into the flow-through chamber 42, wherein the intake valve 54 is closed. The power piston 18 has nearly reached its top dead point, wherein the exhaust valve 50 is still open at the end of the exhaust stroke.

FIG. 6 shows the internal combustion engine in a state a little after the state of FIG. 5, in which the compression piston 16 moves into its top dead point with further closing of fresh charge intake valve 46 and the power piston 18 has already reached its top dead point. The flow-through valve 52 is widely opened when the flow-through piston 40 is located approximately in its bottom dead point, wherein the opening can be further assisted by not allowing the flow-through valve 52 to be movable out of the flow-through piston 40 by the full stroke of the flow-through piston 40, so that it is lifted off from its seat by the movement of the flow-through piston into its bottom dead point. The fresh charge compressed by the compression piston 16 flows through into the flow-through chamber 42.

The volume of the compression chamber 34 is minimal in the top dead point of the compression piston 16 and is advantageously only as large as is required due to tolerances.

FIG. 7 shows the state of the internal combustion engine in which the compression piston is still located in the region of its top dead point and the power piston 18 has already left its top dead point.

The fresh charge intake valve 46 is closed. The flow-through piston 40 moves towards its top dead point while reducing volume of the flow-through chamber 42, wherein the flow-through valve 52 is closed due to the lack of pressure in the compression chamber 34 and the intake valve 54 is open, so that the compressed fresh charge located in the flow-through chamber 42 is pressed over into the power chamber 36, whose volume increases due to the already downwardly-moving power piston 18. The exhaust valve 50 is closed.

FIG. 8 shows the state slightly after the state of FIG. 7, wherein the flow-through piston 40 is located in its top dead point with the flow-through valve 52 closed and the intake valve 54 closed again, the entire compressed charge is located in the power chamber 36 and the combustion begins there, with the exhaust valve 50 still closed, by self-ignition of the diesel fuel that was injected shortly before. In an embodiment of a spark-ignition engine with direct injection, the injection is introduced shortly before the state of FIG. 8 and is ignited approximately in the state of FIG. 8. In an embodiment of a not directly-injected spark-ignition engine, the mixture formation can take place prior to the fresh charge intake valve 46, or e.g., in the region of the flow-through chamber 42.

The volume of the flow-through chamber 42 is minimal in the top dead point of the flow-through chamber and is advantageously only as large as is necessary due to tolerances. It should be less than 15% of the maximum volume of the flow-through chamber (flow-through piston in the bottom dead point), advantageously less than 10%, more advantageously less than 5%, preferably less than 1%.

The state of FIG. 8 is that state that the internal combustion engine assumes shortly after the state of FIG. 2, so that the cycle is completed.

With regard to the beginning of the flowing-through of the compressed fresh charge located in the flow-through chamber 42 into the power chamber 36 (transition from the state of FIG. 6 to the state of FIG. 7), it is advantageous when the valve control timings of the intake valve 54 and the exhaust valve 50 are selected such that a connection of the flow-through chamber 42 with the power chamber 36 begins and/or is existing when there is only a small pressure difference between the chambers of less than 15 bar, preferably less than 10 bar or still more advantageously less than 5 bar. These values are only exemplary and are not limiting. Especially advantageously, at least the connection of the flow-through chamber 42 with the power chamber 36 takes place when the two chambers are at approximately equal pressure. The exhaust valve 50 is closed prior to the top dead point of the power piston 18 so that a certain amount of residual gas remains in the power chamber 36. The intake valve 54 is advantageously still closed when the exhaust valve 50 closes and opens upon arriving at the above-mentioned small pressure difference between the power chamber 36 and flow-through chamber 42 or when approximate pressure equalization is reached, so that the fresh charge is pushed over from the narrowing flow-through chamber 42 into the power chamber 36 in an energetically and/or thermodynamically advantageous way.

As is evident from the preceding, the filling takes place in the compression cylinder 20 with fresh, especially in the full load zone preferably cold, charge and its compression. The compressed charge is pushed into the flow-through chamber while increasing the volume of the flow-through chamber 42; from there the compressed charge is pushed over into the power chamber while decreasing the volume of the flow-through chamber; the charge is combusted in the power chamber to perform mechanical work. The pushing-over of the air compressed in the compression chamber 34 into the flow-through chamber 42 and from there into the power chamber 36 occurs in an energy advantageous manner at small pressure differences between the respective chambers.

For thermodynamic reasons, the compression chamber 34 is as cool as possible and the power chamber 36 is as hot as possible for an efficiency that is as good as possible. The compression cylinder 20 is thus advantageously thermally isolated as much as possible from the power cylinder 22 and is cooled as much as possible, whereas the power cylinder is cooled only as much as is appropriate so that the materials are not thermally overstressed. This is achieved by appropriate distribution of not-illustrated cooling manifolds and/or the partitioning of the cooling system into one cooling system for cooling the power cylinder and one cooling system for cooling the compressing chamber as well as by furnishing the compression cylinder and/or the power cylinder with thermally-decoupling liners. The power piston 18 bordering the hot power chamber 36 is advantageously embodied in a sandwich construction for thermal isolation or is furnished with a thermally-isolating coating, for example made of ceramic.

As a result of the forced charge exchange due to the pushing-over of the compressed fresh charge into the power chamber, only a slight cooling of the power cylinder is required. By integrating the flow-through valve 52 into the flow-through piston 40, space is conserved and nevertheless a flow-through valve having a large flow-through cross section is made possible.

For thermal isolation, the flow-through piston 40 is advantageously thermally-isolated on its side facing the end wall 32, e.g., using a separate isolating layer. The expansion cylinder is also advantageously thermally isolated, e.g., using an inserted liner. Especially advantageous is a thermally-isolated embodiment of the upper side of the power piston 18 and the portion of the lower side of the cylinder head 30, which faces the upper side of the power piston, including at least the corresponding portion of the end wall 32.

In the above-described exemplary embodiment of the invention, the power piston 18 is advanced relative to the compression piston 16, i.e. the power piston 18 reaches its top dead point before the compression piston 16 reaches its top dead point. This results in that the fresh charge, which is pushed out of the flow-through chamber into the power chamber under high pressure, is not compressed further by the power piston. To achieve high compression end temperatures and high compression, it is advantageous when the power piston is retarded slightly relative to the compression chamber so that the fresh charge, which is pushed out of the flow-through chamber into the power chamber, is further compressed by the power piston, wherein it is additionally compressed by the absorbed wall heat of the power chamber. This also reduces the cooling requirement of the power cylinder.

Figure 9:
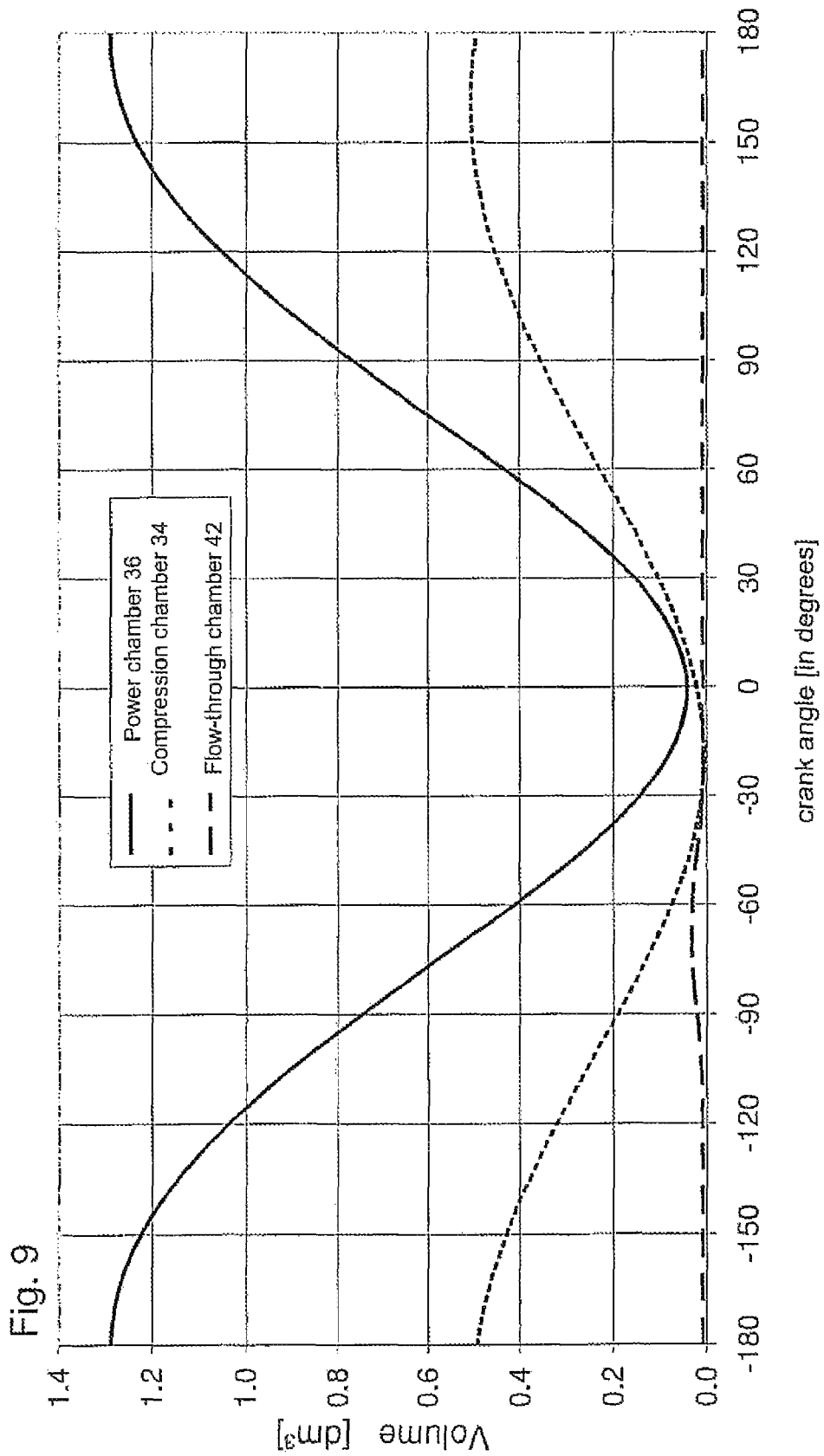
FIG. 9 shows volume progressions in accordance with the position of the crankshaft.
Figure 10:
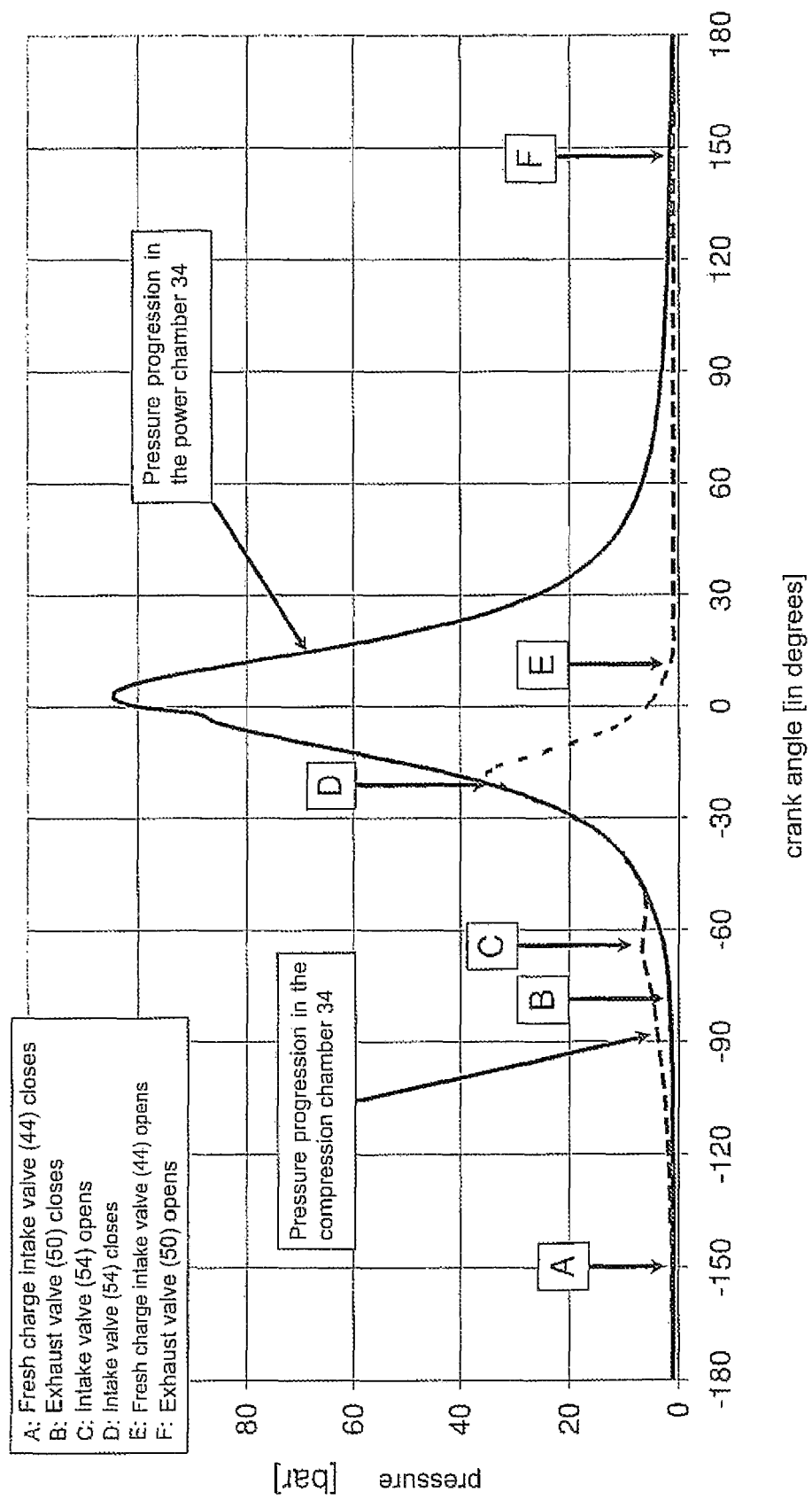
FIG. 10 shows pressure progressions and opening- and closing times of the valves in accordance with the position of the crankshaft.

In the following, a corresponding exemplary embodiment of the inventive internal combustion engine will be explained with the assistance of FIGS. 9 and 10. FIG. 9 shows the volumes of the power chamber 36, the compression chamber 34 and the flow-through chamber 42, each in accordance with the position of the crankshaft, wherein the top dead point of the power piston (minimal volume of the power chamber 36) is indicated by 0°. FIG. 10 provides the pressure progression in the power chamber and the compression chamber and also exemplary opening- and closing time points of the respective valves in accordance with the position of the crankshaft.

As is apparent, the fresh charge intake valve 44 closes at a crank angle of approximately −150°, i.e. slightly after the bottom dead point of the compression piston. The pressure in the compression chamber (dashed curve) then increases with decreasing volume of the compression chamber 34. At a crank angle of approximately −100°, the flow-through piston begins to move away from its top dead point so that the volume of the flow-through chamber 42 increases. At approximately −95°, the flow-through valve 52 opens so that compressed fresh charge is pushed over into the flow-through chamber 42 while further reducing the volume of the compression chamber 34 and increasing the volume of the flow-through chamber 42. At approximately −75°, the exhaust valve 50 closes, whereby the discharge of combusted charge from the power chamber 36 is ended. At approximately −65°, i.e. at about the maximum volume of the flow-through chamber 42, the intake valve 54 opens, so that compressed air is pushed out of the flow-through chamber into the power chamber, wherein the pressure in the flow-through chamber is preferably nearly the same as the pressure of the power chamber or there is a pressure difference of less than 15 bar, advantageously less than 10 bar or even better less than 5 bar. The pushing-over and the pushing-out of the compressed air continues until the compression chamber and the flow-through chamber have their smallest volume, wherein the pressures increase up to about −20°, at which value the compression piston and the flow-through piston arrive in the top dead point and the flow-through valve 52 and the intake valve 54 close.

The compressed charge located in the power chamber ignites, whereby the pressure progression illustrated in FIG. 10 results in the power chamber 36. At a crank angle of about 10°, the fresh charge intake valve 44 opens, so that the filling of the compression chamber 34 begins again. At a crank angle of approximately 140°, the exhaust valve 50 opens for the exhaust of the combusted charge.

According to the described process control, it is possible, due to the continuously high wall temperatures in the power chamber 36 and due to the injection into hot residual gas, to also combust gasoline in a process of direct injection into the power chamber without the assistance of a spark plug, similar to diesel fuel in a self-ignition process, so that gasoline as well as diesel fuel can be utilized according to the inventive method.

As is derivable from the preceding, the flowing-over of the fresh charge compressed in the compression cylinder 22 into the flow-through chamber 42 and from there the pushing-over into the power chamber can be controlled in a wide variety of different ways. From a flow standpoint, it is energetically advantageous when the fresh charge compressed in the compression chamber 34 flows-over into the initially-enlarged flow-through chamber already during its compression and from there is pushed out into the power chamber when there is at least substantial pressure equilibrium between the flow-through chamber and the power chamber, wherein the substantial pressure equilibrium between the flow-through chamber and the power chamber can be maintained during the pushing-out. As a result, the pushing-over and the pushing-out can overlap. If the volume of the compression chamber is about zero at the end of the pushing-over and the volume of the flow-through chamber is about zero at the end of the pushing-out, it is ensured that the entire fresh charge, which is compressed outside of the power chamber, arrives in the power chamber. It can be beneficial for the combustion conditions inside the power chamber that the pushing-over begins to take place after the end of the flowing-through, wherein the pressure in the flow-through chamber increases by means of the exhaust gas energy due to the warming of the fresh charge that is momentarily stored therein and the pushing-out then takes place within a relatively short time period.

As is further derivable from the preceding, the compression of the fresh charge is given by the relationship of the maximum volume of the compression chamber to the compressed volume, i.e. to the minimal volume of the power chamber 36. The expansion is given by the relationship of the volume of the power chamber 36 at the opening of the exhaust valve 50 to the compressed volume and can thus be larger than the compression. The inventive internal combustion engine can thus operate with extended expansion, i.e. an expansion that is larger than the compression, which is thermodynamically advantageous.

The actual compression of the fresh charge, i.e. the relationship of the fresh charge volume drawn-in during each intake stroke to the minimum volume of the power chamber can be changed by the control timing of the fresh charge intake valve 46. According to the field of application and the load spectrum of the engine, it can be appropriate to operate only in the partial load operation range with extended expansion, i.e. larger expansion than compression. This can be achieved, e.g., by changing the valve control timings of the fresh charge valve 46 by closing the fresh charge intake valve increasingly prior to the top dead point of the compression piston or after the top dead point of the compression piston at reduced loads of the internal combustion engine, so that the actual drawn-in and then compressed fresh charge volume decreases. In such a case, it can be appropriate to construct the compression piston 16 and the compression cylinder 20 with the same geometric dimensions as the power piston 18 and the work cylinder 22, i.e. with the same bore and stroke. It is understood that the volume of the compression chamber in the top dead point of the compression piston is advantageously nearly 0° also in such an embodiment, so that the entire compressed fresh charge is pushed over into the flow-through chamber.

Figure 11:
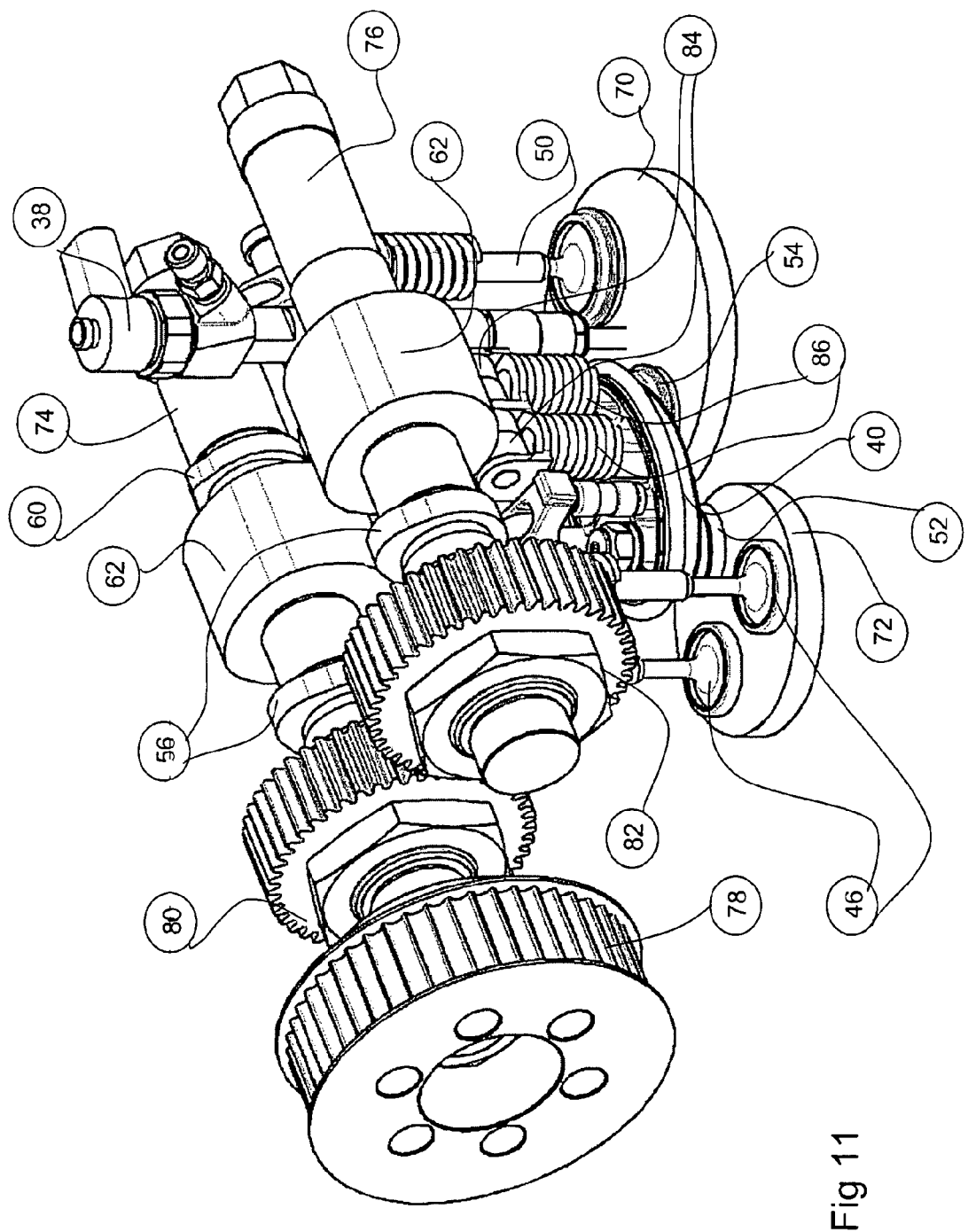
FIG. 11 shows a perspective view of an exemplary valve mechanism.

FIG. 11 schematically shows an inventive cam mechanism in an exemplary manner. The portion of the end wall of the cylinder, which upwardly encloses the power chamber 36, is denoted with 70. The portion of the end wall of the cylinder, which upwardly encloses the compression chamber 34, is denoted with 72. The valves and cams are denoted with the same reference numerals as in the previous Figures.

The valve mechanism includes two cam shafts 74 and 76; a gear 78 is carried by one shaft, is connected with a gear of a crankshaft via a chain or a cam belt and rotates at the same speed as the crankshaft. The cam shafts are borne in not-illustrated bearings so as to be fixed relative to the engine and include gear wheels 80 and 82 meshing with each other, so that they rotate in the opposite directions at the same speeds. Two fresh charge intake valves 46 are provided, each of which is actuated by a fresh charge cam 56 that is formed on each of the cam shafts 74 and 76.

In the illustrated embodiment, an exhaust valve 50 is provided that is actuated by a not-illustrated exhaust cam formed on one of the cam shafts 74 or 76. It is understood that the exhaust valve 50 can be actuated by cams formed on both cam shafts or two exhaust valves could be provided.

The intake valve 54 is actuated by an intake cam 60 formed on the cam shaft 74, wherein a shaft of the intake valve is guided through the flow-through piston 40 while being sealed relative thereto, as is apparent from FIG. 1. The flow-through piston 40, which overlaps the compression chamber 34 and the power chamber 36, is oval-shaped in top view and is integrally constructed with four shafts in the illustrated example; rollers 84 are borne at the free ends of the shafts and each abuts on a flow-through cam 62 that is formed on each of the cam shafts 74 and 76. The rollers 84 are urged into abutment on the flow-through cams 62 by springs 86, which are supported between the engine housing and the shafts of the flow-through pistons 40 that are not provided with reference numerals, i.e. the springs upwardly press the flow-through piston 40 of FIG. 1 into the position in which the flow-through chamber 42 has the maximum volume. The cams 62 are contoured such that, when they abut on the cam base circle, the flow-through piston 40 is downwardly pressed against the force of the springs into a position in which the volume of the flow-through chamber 42 is minimal and/or nearly zero. The contour of the cams is inclined so that the flow-through piston performs a stroke corresponding to the double-dotted line of FIG. 9, wherein the pressure prevailing in the flow-through chamber assists the force of the springs 86. With the described construction, it is achieved that no high surface pressures arise in the cam mechanism as in conventional cam drives.

Figure 12:
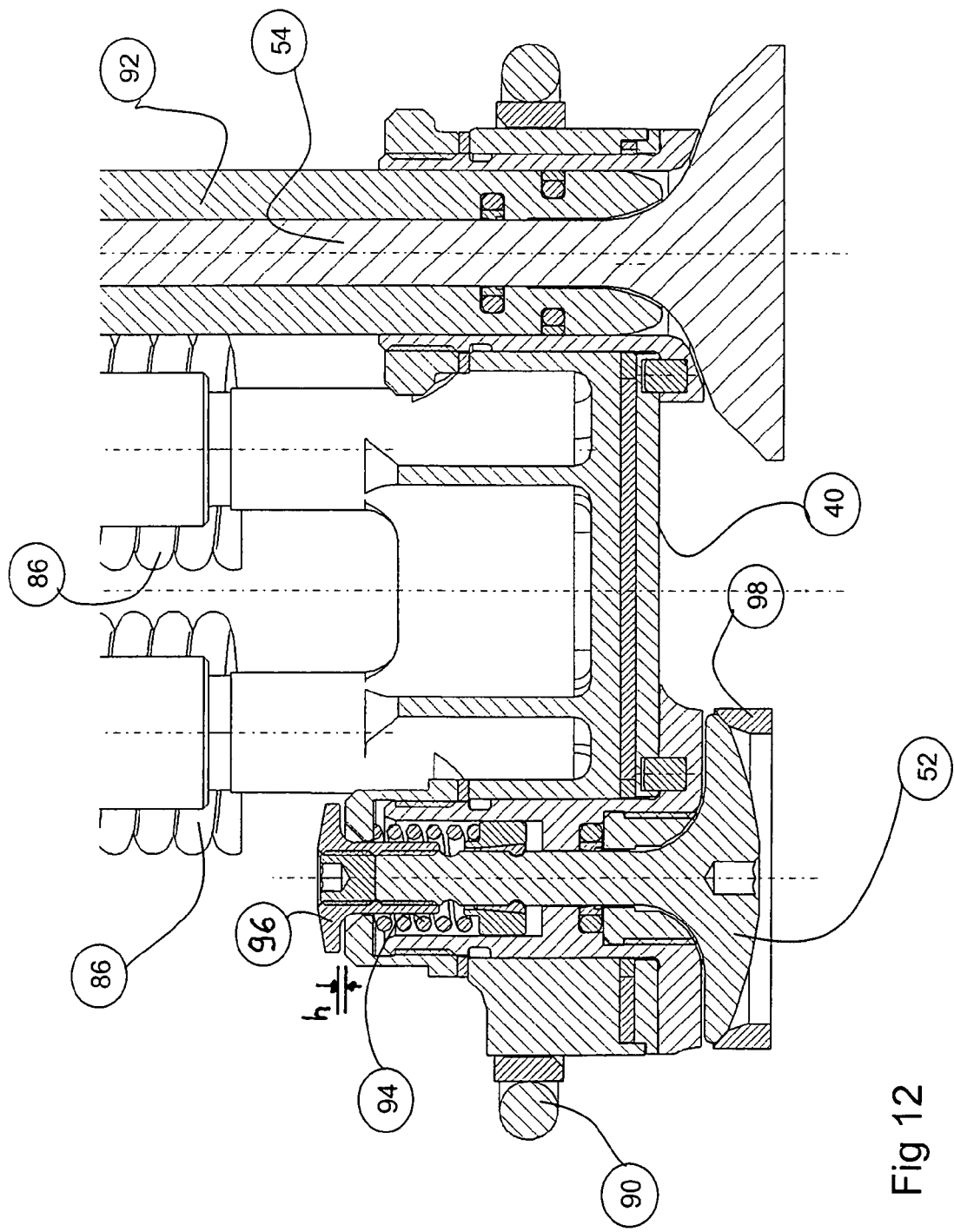
FIG. 12 shows a section through a flow-through piston having a flow-through valve disposed therein.

FIG. 12 shows a cross section through the flow-through piston 40 having the intake valve 54 and the flow-through valve 52 accommodated therein. The flow-through piston 40 is upwardly and downwardly movable though one or more seals 90 while being sealed in the cylinder head 30 (FIG. 1). The shaft of the intake valve 54 is guided in a sleeve 92 while being sealed relative thereto; the sleeve 92 is in turn guided in the flow-through piston 40 while being sealed relative thereto.

The shaft of the flow-through valve 52 is displaceably guided under sealing within the flow-through piston 40 is pressed downwardly according to FIG. 12 by a spring 94 that is supported at its upper end on a collar of the flow-through piston and on its lower end on a collar fixedly connected with the flow-through valve 52. A sleeve 96 is affixed at the upper end of the shaft and includes a collar that is movable relative to the flow-through piston 40 by an amount h, which is considerably smaller than the maximum stroke of the flow-through piston 40.

In the illustrated position, the flow-through piston 40 assumes the position in which the volume of the flow-through chamber 42 is minimal and the valve plate of the flow-through valve 52 abuts on a valve seat 98 that is formed on the end wall 32 (FIG. 1).

As was already explained, the function is such that the flow-through valve 52 can initially remain closed during movement of the flow-through piston 40 from its top dead point during a stroke h of the flow-through piston 40 and then it forcibly lifts off the valve seat 98. According to the dimensioning of the spring 94, its force can be overcome by the pressure in the compression chamber 34 already prior to movement of the flow-through piston 40 by the stroke h, so that the flow-through valve 52 already opens immediately after the start of the movement of the flow-through piston 40 away from its top dead point.

The exemplary-described inventive internal combustion engine can be modified in a variety of ways:

The flow-through valve 52 can be formed as a simple check valve that is opened merely by the pressure in the compression chamber 34 against the force of a spring supported on the engine housing, wherein the spring force is adjusted accordingly.

The flow-through valve can be omitted as its own component when the flow-through piston is itself formed in an appropriate manner.

The flow-through piston 40 can move towards its bottom dead point immediately after the pushing-over of the fresh charge into the power chamber 36 and closing of the intake valve 54 while increasing the volume of the flow-through chamber 42, so that the compression piston 16 transfers fresh charge into the flow-through chamber 42 immediately after the initiation of the upward movement.

To adapt the opening- and closing time points of the respective valves to the operational conditions, phase adjusters can be provided. Further, it is possible to not directly actuate the valves by rotating the not-illustrated crankshaft of the internal combustion engine, but rather to provide their own valve actuators that are appropriately controlled. The actual compression and the ignition conditions can be influenced by the closing time point of the exhaust valve; this closing point can be adapted, if desired, to the differing operational conditions by an appropriate adjusting device.

For the purpose of heating-up a catalytic converter at the start and during the warm-up, it can be advantageous to actuate the valves 50 using a variable valve mechanism such that it opens early for a rapid heating-up of the catalytic converter. For the same reason, it can be appropriate to actuate the flow-through valve 52 for the heating-up of the catalytic converter such that the fresh charge is pushed later into the power chamber and/or the combustion takes place as late as possible.

For an intensive charge movement in the power chamber 36, it can be advantageous to provide the intake valve 54 with a masking.

Instead of a cam mechanism, a hydraulic, pneumatic or electronic drive can be provided, in particular for positively driving the flow-through piston 40.

The movement of the flow-through piston can be controlled such that, at the start of a compression stroke of the compression piston, it is located at least nearly in the position in which the volume of the flow-through chamber is maximal. The flow-through valve is then open substantially during the entire compression stroke of the compression piston so that the compression of the fresh charge and its pushing-over into the flow-through chamber takes place simultaneously or at least substantially overlapping.

In dependence upon the intended construction of the motor and compromises in the engine characteristics, it can be advantageous to equip the compression cylinder and/or the power cylinder with a system for changing the geometrical compression or to vary the actual compression by appropriate changing of the valve control times. Likewise, it can be appropriate to provide a system, with which the phase difference between the movement of the compression piston and the associated power piston can be changed.

Due to the high alternating forces that act on the chain or a cam belt, which e.g., drives the cam shaft gear wheel 78 (FIG. 11), it is advantageous to provide an intermediate shaft between the crankshaft and the cam shaft; the intermediate shaft is advantageously disposed underneath the cam shafts 74 and 76 according to FIG. 11 in order to achieve a short structural height of the cylinder head. The intermediate shaft includes a small-diameter drive gear so that the intermediate shaft rotates at a higher rotational speed than the cam shaft. The two cam shafts are advantageously driven in opposite directions via a gear wheel on the intermediate shaft, wherein the gear wheels of the cam shafts are correspondingly larger so that an overall transmission ratio of 1 between the crankshaft and the camshafts is achieved. For compensating mass moments of the first order (in a 4-cylinder arrangement having two compression cylinder/power cylinder units), compensating masses are also advantageously disposed on a camshaft rotating in the opposite direction relative to the crankshaft in addition to compensating masses on the crankshaft; the compensating masses are located, e.g., at both ends of the camshaft and are offset by 180° relative to each other.

The geometric dimensions of the pistons and the piston strokes are designed in accordance with the respective demands in view of thermodynamic factors such that as high a filling of the power chamber 36 as possible is achieved with low compression work and flow-through work and such that when the internal combustion engine is operated without external spark-ignition, temperatures are reached in the region of the top dead point of the power piston 18, at which directly-injected fuel or directly-introduced gas spontaneously ignites in a reliable manner. For external spark-ignited operation with gasoline, the compression end temperature can be correspondingly lower.

The inventive internal combustion engine can be operated as an aspirated engine or in a charged manner.

It can be advantageous to influence the charge composition in the power cylinder by utilizing an additional purge valve (similar to a two-cycle engine having valves controlled in a head), i.e. to assist the pushing-out of the residual gas, whereby more fresh air is located in the power cylinder when "the exhaust closes" and the temperature level is lowered.

An exemplary engine, to which the graphs of FIGS. 9 and 10 as well as the illustrations of FIGS. 11 and 12 relate, has the following dimensions:

|  | Compression piston | Flow-through piston | Power Piston |
| --- | --- | --- | --- |
| Bore (mm) | 86 | 65* | 115 |
| Stroke (mm) | 86 | 7 | 120 |
| Top Dead Point Volume (cm$^3$) | ~0 | ~0 | 38 |

*In this example, the flow-through piston has an elliptical form in order to optimally fulfill the demands with respect to volume progression and flow-through cross-section progression.

The over-expansion of this engine is at about 2.5, which is optimal for full load efficiencies. A smaller over-expansion of, e.g., 1.8 is advantageous for the optimization of the efficiencies in the partial-load range, i.e. the power piston can then be smaller.

According to the inventive engine, actual intermediate pressures of over 20 bar were achieved in direct-injection with diesel fuel as well as with gasoline and actual efficiencies of over 55% were achieved.

The ratio of the volumes of the power chamber to the flow-through chamber, each in the top dead point of the associated piston, should advantageously be between 25 and 60. The ratio of the volumes of the compression chamber to the flow-through chamber, each in the bottom dead point of the associated piston, should be between 15 and 25. The geometric compression ratio of the power chamber is advantageously between 25 and 40. The intake valve, which closes when the flow-through valve has reached its top dead point, advantageously closes in a range between 20 and 5° of the crank angle before the top dead point of the power piston. The above-mentioned values are only exemplary and are not limiting.

A glow plug can also be installed to assist the cold-starting capability in a not externally spark-ignited operation.

The internal combustion engine was described above with direct-injection into the power cylinder 22 (injection valve 38), wherein it can also be operated with substantially any fluid or gaseous fuel without external spark-ignition.

In the preceding, the time point of the direct-injection was not explained in detail, because the time progression of the direct-injection, as is well known, can be chosen, wherein the fuel injection can be subdivided into pre-injections, which occur before the top dead point of the power piston, and main injections, which occur in the region of or after the top dead point. According to the invention, the fuel can be injected (fluid fuel) into the power chamber or can be introduced (gaseous fuels) between the time points B and C (FIG. 10), i.e. the fuel can be fed into the power chamber while only residual gas is located in the power chamber. This residual gas is compressed together with the fed-in fuel, wherein an excellent homogenization of the fuel and the residual gas takes place due to the high temperatures, so that the fuel is present in a completely gaseous form, even if diesel fuel is used, at the time point C, at which time point the intake valve opens, and completely combusts with the compressed fresh air by spontaneous ignition. The amount of residual gas amount in the power chamber is determined by the closing time point B of the exhaust valve. The opening time point C of the intake valve and the closing time point D of the intake valve are tuned to the ignition conditions, together with the volumes of the compression chamber, the flow-through chamber and the power chamber as well as the volume of the power chamber in the top dead point of the power piston such that the combustion of the air-fuel-residual gas-mixture substantially takes places after the top dead point of the power piston. The time period between time point B (exhaust valve closes) and time point C (intake valve opens) is selected such that the previously-discussed homogenization of the fuel-residual gas-mixture takes place in an adequate manner prior to the introduction of the compressed fresh air. As compared to the direct-injection of the fuel near the top dead point of the power piston, the inventive injection and/or introduction of the fuel into the residual gas has not only the advantage of the excellent fuel homogenization, but also the advantage that the injection takes place at a lower pressure level, whereby the expense for the fuel injection equipment is reduced. Whereas fuel is conventionally injected into the power chamber that contains fresh air, according to the invention, compressed fresh air is fed into the power chamber, in which a non-combustible fuel-residual gas-mixture is present.

Especially when the internal combustion engine is operated with external mixture-formation outside of the power chamber, as will be explained below, the pushing-out of the fresh charge from the flow-through chamber 42 into the power chamber 26 must be tuned to the combustion in the power chamber 36 such that the pressure in the flow-through chamber 42 is higher than the pressure in the power chamber 36. The pressure in the flow-through chamber 42 increases when the amount of fresh air fed-in each power cycle (quantitative control) increases with increasing load. On the other hand, the pressure prevailing in the power chamber 36 when the intake valve 54 opens is nearly load-independent. It is therefore appropriate to form the intake valve 54 in an inverted manner, as is illustrated in FIG. 13.

As shown in FIG. 13, the intake valve 54 is downwardly urged from above by its spring into abutment on the valve seat disposed in the inner wall 32 (FIG. 1) of the cylinder head, i.e. the disk of the intake valve 54 is formed with a seat surface that tapers downwardly. The opening of the intake valve 54 takes place via a roller rocker arm 102, which is supported between the engagement of the roller rocker arm 102 with the spring 100 and the abutment of the roller of the roller rocker arm on the intake cam 60 on a counter bearing 104 affixed to the engine housing; the counter bearing 104 is advantageously formed as a valve-clearance compensating element. As is apparent, the roller rocker arm 102 is pivoted by the intake cam 60 in the counter-clockwise direction against the force of the spring 100 in order to open the valve, whereupon the intake valve 54 is opened by the pressure in the power chamber.

The valve seat is advantageously formed such that an isolating residual gas coating is formed on the wall of the power chamber.

As was already explained with the assistance of FIG. 11, considerable forces are required to actuate the flow-through piston for pushing out the fresh charge into the power chamber. In order to apply these forces without excessively burdening the valve mechanism, it is advantageous to actuate the flow-through piston 40 using one or, if desired, more roller cam followers 106 as shown in FIG. 14. The roller cam follower 106 is borne on the engine housing, if desired using a valve-clearance compensating element, at 108. On its end facing away from the bearing 108, a roller 110 of the roller cam follower is in abutment on the flow-through cam 62. A cam follower 112 is inserted between the roller 110 and the bearing 108 on the roller cam follower 106; the cam follower 112 actuates the flow-through piston 40 (FIG. 1). As a consequence of the leverage achieved with this construction, the stroke, which the cam follower 112 carries out, can be reduced relative to the stroke of the roller 110 and the force transmitted from the cam follower 112 to the flow-through piston can be increased in a corresponding manner.

FIG. 15 shows a valve mechanism having the structural elements of FIGS. 13 and 14, the construction of which is apparent with the assistance of the reference numerals that are utilized and therefore it will not be described in detail. The structures according to FIGS. 13 and 14 can be utilized individually or in combination.

With the assistance of FIG. 16, it will be explained in the following that the internal combustion engine can also be operated with external mixture-formation.

Figure 18:
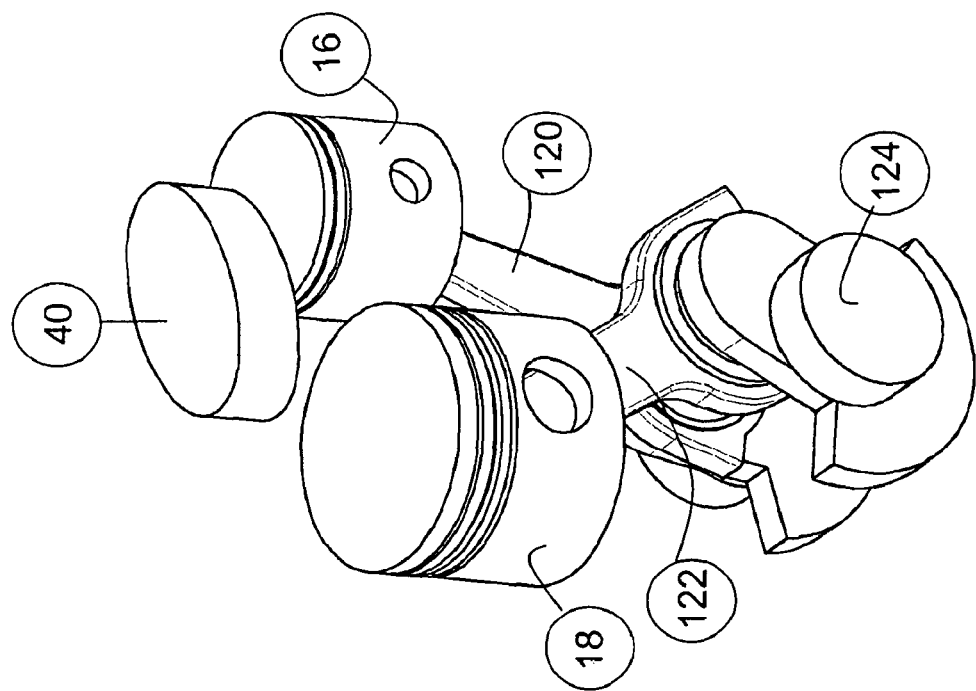
FIG. 18 shows a schematic perspective view of the piston of a cylinder unit of the internal combustion engine according to Fig. 17 with a crankshaft.

FIG. 16 shows a simplified view of a unit comprised of a compression cylinder 20, flow-through cylinder 33 and power cylinder 22. An injection valve 126 is disposed in the fresh charge intake manifold 44 that leads to the compression cylinder 20; the injection valve injects fluid fuel or combustible gas into the fresh charge intake manifold 44 as is known in conventional intake-manifold fuel injection; the fresh charge intake manifold 44 intakes fresh air through an air filter or is connected to the compressor of a charging device. Especially when one or more injection valves 126 are disposed in each fresh charge intake manifold 44 leading to a compression cylinder 20 for multi-cylinder internal combustion engines, the fuel injection preferably does not take place continuously, but rather only during the time period, during which the compression chamber 34 is being filled with fresh air through the open fresh charge intake valve 46 (not illustrated in FIG. 18).

Any kind of fluid or gaseous fuel can be fed through the injection valve 126. Non-volatile diesel fuel can also be injected, wherein the generated mixture is at least substantially completely vaporized during the compression in the compression chamber 34 and the subsequent pushing-over into the power chamber 36 via the flow-through chamber 42 and is pre-processed in an excellent manner and is homogenized. The part of the mixture that is pushed-out into the power chamber arrives at ignition conditions due to the high wall temperatures prevailing in the power chamber and due to the thorough mixing with the hot residual gas present in the power chamber. As a result, neither the diesel fuel-air-mixture nor, in operations with gasoline, the gasoline-air-mixture or, in gaseous operation, the gas-air-mixture, spontaneously ignites all at once, but rather a relatively smooth combustion as shown in FIG. 10 takes place due to the temporal progression of the mixture-pushing-out, the pressure progression of which takes place without pressure spikes for external injection as well as for injection directly in the power chamber, as occur in pulsating operation of conventional gasoline engines or conventional diesel motors. As a consequence of this smooth combustion, components experiencing load can be dimensioned in a diminished manner and the service life of the engine increases. A further advantage, which is achieved with the inventive method, especially for intake manifold fuel injection of diesel fuel, is that a particle filter can be omitted and that conventional exhaust gas post-treatment with inexpensive catalysts makes possible the fulfillment of the strictest exhaust gas emission laws. It can be appropriate to provide an ignition-helper, such as a spark plug or glow plug, in the power chamber for certain operational conditions, e.g., cold-starting or low partial-load.

The torque and power characteristics, which are achieved with the described internal combustion engine, are substantially independent of whether it is operated with fuel injection directly into the power chamber or with external fuel injection, wherein a system pressure (fuel pressure upstream of the injection valve) between 3 and 8 bar is quite sufficient for external fuel injection.

The injection valve 126 or the injection valves are not required to be disposed upstream of the compression chamber 34. The injection can also take place directly into the compression chamber 34 or into the flow-through chamber 42.

The substantial efficiency improvement achieved by embodiments disclosed herein may be attributed to one or more of the following factors:

A part of the compression takes place outside of the combustion chamber and/or the power chamber, whereby the compression takes place at a lower temperature and the compression work is reduced. A part of the exhaust gas energy is used by feeding the compressed fresh charge, which is heated to a large extent or only a little, into the hot combustion chamber and/or the hot power chamber and absorbing thermal energy there. To further improve the use of the exhaust gas heat, the exhaust gas flowing out of the exhaust manifold 48 can be used to heat the flow-through chamber 42 by leading it, e.g., to the rear side of the flow-through piston 40 along or through it and/or heating-up the circumferential wall of the flow-through cylinder 33. In this case, the flow-through piston is not thermally isolated relative to the flow-through chamber. It can also operated with two flow-through cylinders, the flow-through chambers of which are alternately supplied with exhaust gas and compressed fresh charge. It is understood that the heating-up of the flow-through chamber is performed such that, as much as possible, the temperature of the compression chamber does not increase. When heating-up the compressed fresh charge pushed-over into the flow-through chamber, it is further thermally compressed and the opening time point of the intake valve is adapted accordingly.

The wall heat losses are reduced, because the power chamber, which is thermally isolated relative to the compressor, is only required to be cooled a little or the power chamber can completely forgo an external cooling.

The process steps take place with extended expansion.

Further advantages of the exemplary engine are its smoother running and its diverse fuel capability. The engine can be operated with fluid fuels, gaseous fuels and also powderized solid fuels.

Figure 17:
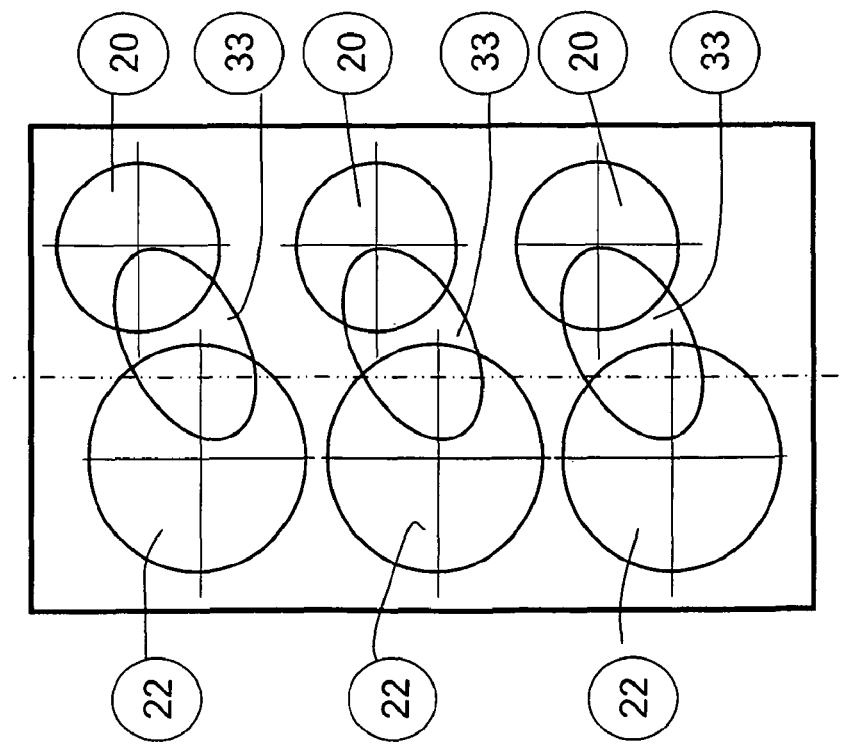
FIG. 17 shows a schematic top view onto an inventive multi-cylinder internal combustion engine.

FIG. 17 shows a schematic view of a three-cylinder internal combustion engine, wherein the individually-described cylinder units comprised of a compression cylinder 20, flow-through cylinder 33 and power cylinder 22 are disposed in succession in a row. The compression piston 16 and power piston 18 can be connected via piston rods 120, 122 (FIG. 18) with a common crankshaft 124, the rotational axis of which is indicated in FIG. 17 with a double-dotted dashed line. The piston rod 120 of the compression piston 16 and the piston rod 122 of the power piston 18 of each of the units can operate together with a common crank, which includes a crankpin having two crankpin segments offset relative to each other and disposed successively in the longitudinal direction of the crankshaft 124; the desired phase offset between the movement of the power piston 18 and the compression piston 16 is achieved using the crankpin segments. The power piston 18 and the compression piston 16 can also operated together with their own respective offsets and/or cranks, in order to achieve the desired phase offset between the power piston and the compression piston, which can also be zero.

A cam mechanism is provided for all valves and for the flow-through piston, e.g., in accordance with FIG. 11 or 15; the cam mechanism extends along the entire internal combustion engine.

The cylinder units according to certain aspects of the present teachings having the compression piston, flow-through piston and power piston can be provided in any number and arrangement as is also known for conventional engines.

To minimize the thermal warping of the engine, it can be advantageous, especially in an embodiment having two compression cylinders and two power cylinders, to dispose the power cylinder on the outer end side of the engine, i.e. the control mechanism side and the flywheel side, and to dispose the compression cylinder between them. However, for an optimal torque balancing and short conduit passages for a possible charging system, it can be advantageous to provide the compression cylinder on the end side and the hot cylinder between them.

The internal combustion engine according to certain aspects of the present teachings can be operated with a stochiometric air-fuel-mixture ($\lambda=1$) or with a pure ly load-dependent fuel amount injection for direct injection as well as for intake manifold fuel injection. In the first case, the amount of air must be controlled and metered in a load-dependent manner, so that the injected fuel amount can be tuned to the air flow-rate. Depending on the operating point of the internal combustion engine, it is possible to change over from one operating mode to another. The respective operating mode determines in a known manner the catalysts utilized for the exhaust gas post-treatment and further important parameters for the exhaust gas post-treatment, such as the amount of the exhaust gas recirculation.

The internal combustion engine according to certain aspects of the present teachings is capable of combusting a variety of fuels, i.e. it can be operated, as explained above, with substantially all types of fluid and gaseous fuels. The respective utilized and/or refueled fuels can be determined in a known manner and the individual valve control timings can be tuned to the respective fuel by using appropriate valve actuating systems. In particular, by changing the opening time point of the exhaust valve and changing the phasing of the movement of the flow-through piston relative to the crankshaft rotation, the temperature in the power chamber reached at the time point of the top dead point of the power piston can be influenced.

To improve the cold-start performance for intake manifold fuel injection, it can be appropriate to dispose a temporarily-heated heating element across from the injection valve, with which heating element the mixture formation is aided in the cold state. Further, it can be appropriate to dispose a temporarily-heated element in the power chamber, for example, a glow plug.

In particular when operating with direct-injection, it is possible to operate the internal combustion engine with different fuels with the same control times of the valves and to account for the fuel type only by changing the timing of the injection, which is possible in a simple way with electronically-controllable injection valves.

The described methods of the direct injection or introduction of fuel into the power cylinder, such that the fuel is introduced into compressed gas containing fresh air or the fuel is introduced into residual gas containing no air and/or no oxygen, or the fuel is introduced upstream of the power cylinder into uncompressed or compressed fresh air, can be combined with each other so that fuel ratios are introduced in accordance with the different methods. The ratios can be changed, e.g., in a load-dependent or temperature-dependent manner.

For the described embodiments of the inventive internal combustion engine, the following possibilities for the load controlling and fuel introduction, among others, are possible:

Under ambient conditions or low positive pressure of gaseous fuel or fluid fuel in the form of gasoline or diesel fuel, fuel injection into the intake manifold can take place, e.g., via a multipoint fuel-injection system. For this purpose, a lambda 1 control or lean-burn control as well as using a quantitative control via a throttle valve in the intake manifold or via a fresh charge intake valve variable with respect to the valve control times is possible. Further, fluid fuel can be injected directly into the compression cylinder, if desired also into the flow-through cylinder, wherein the load can be controlled via a throttle valve or advantageously via a fresh charge intake valve having variable valve control timings and a lambda 1 as well as a lean-burn control is possible. The load can also be set by the amount of fuel.

In the alternative, gasoline or diesel fuel can be injected directly into the hot power cylinder, wherein the load is advantageously regulated by the injected fuel amount.

During fuel introduction into the intake manifold or into the compression chamber, the load control advantageously takes place by controlling the fresh air flow-rate using variable control timings of the fresh charge intake valve. The volume ratio of the power chamber to the compression chamber can be, e.g., between 1 and 3, wherein it can be less when used in the internal combustion engine of a passenger vehicle than when used in a truck and it is the largest when used in a stationary engine, which predominately runs at full load.

The content of the residual gas in the power chamber can be controlled by variable control timing of the exhaust valve, wherein the control timing of the exhaust valve can be fixedly set when operating predominately at full load.

The phase difference between the power piston and the compression piston can be, e.g., between −5° and +10° of the crank angle, wherein the hot power piston is advantageously retarded relative to the cold compression piston.

In the above-mentioned application, the fresh charge intake valve advantageously opens after the top dead point of the compression piston, e.g., up to 20° after the top dead point of the compression piston, and advantageously closes after the bottom dead point of the compression piston, e.g., 20° after its bottom dead point.

The flow-through valve advantageously opens considerably before the top dead point of the compression piston, e.g., 90° before the top dead point, and closes in the range of the top dead point of the compression piston.

The intake valve, which connects the flow-through chamber with the power chamber, advantageously opens before the top dead point of the power piston, e.g., 10° before its top dead point. It advantageously closes after the top dead point of the hot power piston, e.g., 35° after its top dead point, wherein the combustion of the fresh charge pushed-out into the power chamber persists substantially over the opening duration of the intake valve.

The exhaust valve advantageously opens considerably after the top dead point of the hot power piston, e.g., 150° after its top dead point and advantageously closes before the top dead point of the power piston, e.g., 70° before its top dead point.

The flow-through piston advantageously begins its movement considerably before the top dead point of the compression piston, e.g., 90° before its top dead point. The flow-through piston advantageously ends its movement after the top dead point of the cold compression piston, e.g., 30° after its top dead point.

The above-given values are exemplary and not limiting and apply, e.g., for the case of external mixture formation.

| Reference Numeral List | |
|---|---|
| 10 | Crankshaft |
| 12 | Piston rod |
| 14 | Piston rod |
| 16 | Compression piston |
| 18 | Power piston |
| 20 | Compression cylinder |
| 22 | Power cylinder |
| 24 | Cylinder liner |
| 28 | Cylinder housing |
| 30 | Cylinder head |
| 32 | End wall |
| 33 | Flow-through cylinder |
| 34 | Compression chamber |
| 36 | Power chamber |
| 38 | Fuel injection valve |
| 40 | Flow-through piston |
| 42 | Flow-through chamber |

-continued

| Reference Numeral List | |
|---|---|
| 44 | Fresh charge intake manifold |
| 46 | Fresh charge intake valve |
| 48 | Exhaust manifold |
| 50 | Exhaust valve |
| 52 | Flow-through valve |
| 53 | Spring |
| 54 | Intake valve |
| 56 | Fresh charge cam |
| 58 | Exhaust cam |
| 60 | Intake cam |
| 62 | Flow-through cam |
| 70 | End wall |
| 72 | End wall |
| 74 | Camshaft |
| 76 | Camshaft |
| 78 | Gear |
| 80 | Gear wheel |
| 82 | Gear wheel |
| 84 | Roller |
| 86 | Spring |
| 90 | Seal |
| 92 | Sleeve |
| 94 | Spring |
| 96 | Sleeve |
| 98 | Valve seat |
| 100 | Spring |
| 102 | Roller rocker arm |
| 104 | Counter bearing |
| 106 | Roller cam follower |
| 108 | Bearing |
| 110 | Roller |
| 112 | Cam follower |
| 120 | Piston rod |
| 122 | Piston rod |
| 124 | Crankshaft |
| 126 | Fuel injection valve |

The invention claimed is:

1. A method for operating an internal combustion engine, the engine comprising:
    at least one power cylinder having a power chamber defined at least in part by a power piston, the at least one power cylinder having an intake valve and an exhaust valve,
    at least one compression cylinder having a compression chamber, which is defined at least in part by a compression piston, the compression cylinder having a fresh charge intake valve and a flow-through valve, and
    a flow-through chamber, which is connected with the compression chamber when the flow-through valve is open and which is connected with the power chamber when the intake valve is open,
    wherein the method comprises:
    flowing-in fresh charge into the compression chamber while increasing the volume of the compression chamber,
    compressing fresh charge located in the compression chamber while decreasing the volume of the compression chamber,
    pushing-over the compressed fresh charge into the flow-through chamber,
    pushing-out the fresh charge located in the flow-through chamber into the power chamber,
    combusting the fresh charge located in the power chamber while increasing the volume of the power chamber and while converting thermal energy into mechanical output power and
    discharging the combusted charge while decreasing the volume of the power chamber,
    wherein the volume of the flow-through chamber increases during at least a part of the pushing-over step and, at the end of the pushing-out step, the volume of the flow-through chamber is less than 15% of the maximum volume of the flow-through chamber.

2. A method according to claim 1, wherein the pushing-out step starts when the flow-through chamber and the power chamber are in approximate pressure equilibrium.

3. A method according to claim 1, wherein the exhaust valve closes before the top dead point of the power piston.

4. A method according to claim 1, wherein the pushing-over step and the pushing-out step do not temporally overlap.

5. A method according to claim 1, wherein the movement of the power piston is retarded relative to the movement of the compression piston.

6. A method according to claim 1, further comprising adding fuel to the fresh charge upstream of the flow-through chamber.

7. A method according to claim 1, wherein the pushing-out of the fresh charge into the power chamber overlaps with the combusting of the fresh charge already located in the power chamber.

8. A method according to claim 1, wherein the parts of the fresh charge pushed-over into the power chamber attain self-ignition conditions due to elevated wall temperatures of the power chamber and a thorough-mixing of the fresh charge with hot residual gas located in the power chamber.

9. A method according to claim 1, further comprising:
    feeding fuel into the power chamber after the discharge of the combusted charge and before the pushing-out of the compressed fresh charge into the power chamber.

10. A method according to claim 1, wherein the compressed fresh air, which is pushed-out from the flow-through chamber into the power chamber, is further compressed by the power piston before the start of the combustion step.

11. A method according claim 1, further comprising heating the flow-through cylinder with exhaust gas from the internal combustion engine.

12. A method according to claim 1, wherein the geometrical compression of the fresh air outside of the power cylinder is greater than a geometrical compression, which the fresh air experiences between its introduction to the power cylinder and before reaching the top dead point of a piston operating in the power cylinder.

13. A method according to claim 1, further comprising cooling the compression cylinder in order to dissipate at least a part of the heat that arises during the compression of the fresh air.

14. A method according to claim 1, wherein the ratio of the fresh charge volume, which flows-in during each flow-in stroke, to the volume of the power chamber in the top dead point of the power piston is less than the ratio of the volume of the power chamber, at the time when the exhaust valve opens, to the volume of the power chamber in the top dead point of the power piston.

15. A method according to claim 1, wherein, at the end of the pushing-out step, the volume of the flow-through chamber is less than 5% of the maximum volume of the flow-through chamber.

16. An internal combustion engine comprising:
    at least one power cylinder having a power chamber defined at least in part by a power piston, the at least one power cylinder having an intake valve and an exhaust valve,
    at least one compression cylinder having a compression chamber, which is defined at least in part by a compression piston, the at least one compression cylinder having a fresh charge intake valve and a flow-through valve, a flow-through chamber, which is connected to the compression chamber when the flow-through valve is open and is connected to the power chamber when the intake valve is open, a crank mechanism connected to the power piston and the compression piston and a controller configured to control the operation of the valves such that fresh charge flows into the compression chamber while increasing the volume of the compression chamber, fresh charge located in the compression chamber is compressed while decreasing the volume of the compression chamber, compressed fresh charge is pushed-over into the flow-through chamber, compressed fresh charge located in the flow-through chamber is pushed-out into the power chamber, fresh charge located in the power chamber combusts while increasing the volume of the power chamber and while converting thermal energy into mechanical output power, and combusted charge is discharged while decreasing the volume of the power chamber, wherein the flow-through chamber is defined by a flow-through piston, which is moveable between a top dead point and a bottom dead point, the volume of the flow-through chamber in the top dead point of the flow-through piston is less than 15% of the volume of the flow-through chamber in the bottom dead point of the flow-through piston and the movement of the flow-through piston is tuned to the movement of at least one of the compression piston and the power piston.

17. An internal combustion engine according to claim 16, wherein the compression piston has a bore and a stroke that are less than those of the power piston.

18. An internal combustion engine according to claim 16, wherein the volume of the compression chamber in the top dead point of the compression piston is nearly zero.

19. An internal combustion engine according to claim 16, wherein the flow-through piston is actuated by a cam mechanism that is driven by the crank mechanism.

20. An internal combustion engine according to claim 19, wherein the cam mechanism includes a plurality of cams that actuate the flow-through piston.

21. An internal combustion engine according to claim 16, wherein the compression cylinder and the power cylinder are located adjacent each other and the flow-through piston operates in a flow-through cylinder, which overlaps the compression cylinder and the power cylinder as viewed in the movement direction of the pistons and is defined by an end wall, which is common to the compression cylinder and the power cylinder, and wherein openings are formed in the end wall that are closeable by the flow-through valve and the intake valve.

22. An internal combustion engine according to claim 21, wherein a shaft of the intake valve extends through the flow-through piston in a sealed manner.

23. An internal combustion engine according to claim 22, wherein the intake valve is formed as a disk valve, the disk of which is disposed in the flow-through chamber and is configured to close when moved towards the end wall.

24. An internal combustion engine according to claim 22, wherein the flow-through valve is formed as a disk valve, which is configured to open when moved in a direction away from the compression chamber and the shaft of which is guided in the flow-through piston in a sealed manner.

25. An internal combustion engine according to claim 24, wherein the flow-through valve is configured to be closed when the flow-through piston is located in the top dead point and is moveable out of the flow-through piston by the force of a spring disposed in the flow-through piston.

26. An internal combustion engine according to claim 16, wherein the power cylinder and the compression cylinder are thermally isolated from each other and the engine is configured to operate such that the temperature level of the power cylinder is higher than the temperature level of the compression cylinder.

27. An internal combustion engine according to claim 16, further comprising a fuel supplying device that includes an injection valve disposed upstream of the fresh charge intake valve.

28. An internal combustion engine according to claim 16, further comprising a fuel supplying device that includes a fuel injection valve that injects into the power chamber.

29. An internal combustion engine according to claim 16, further comprising a fuel supplying device that injects diesel fuel or gasoline or gaseous fuel.

30. An internal combustion engine according to claim 16, further comprising a sensor device configured to sense the type of fuel and a device for changing the phase and the opening duration of the valve, by which the phase and at least one of the opening duration of the valves and the movement of the flow-through piston relative to the rotation of the crankshaft is changeable in dependence on the fuel that is being utilized.

31. An internal combustion engine according to claim 16, further comprising:
 a sensor device configured to sense the air-fuel-ratio,
 a sensor device for sensing a rotational speed of the internal combustion engine, and
 a device configured to change the phase and at least one of the opening duration of the valves and the movement of the flow-through piston relative to the rotation of the crankshaft in dependence on the sensed air-fuel-ratio and the sensed rotational speed.

32. An internal combustion engine according to claim 16, wherein the volume of the flow-through chamber in the top dead point of the flow-through piston is less than 1% of the volume of the flow-through chamber in the bottom dead point of the flow-through piston.

* * * * *